Feb. 7, 1928.
J. H. WILSON
HORSE COLLAR
Filed March 7, 1927
1,658,112
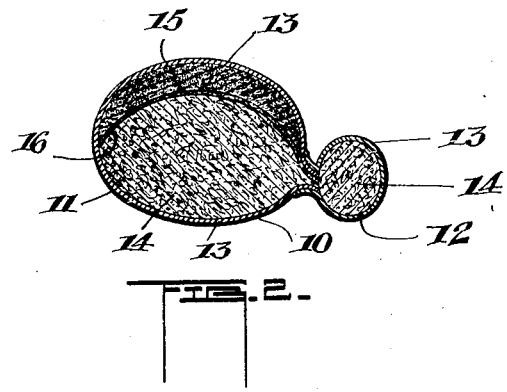
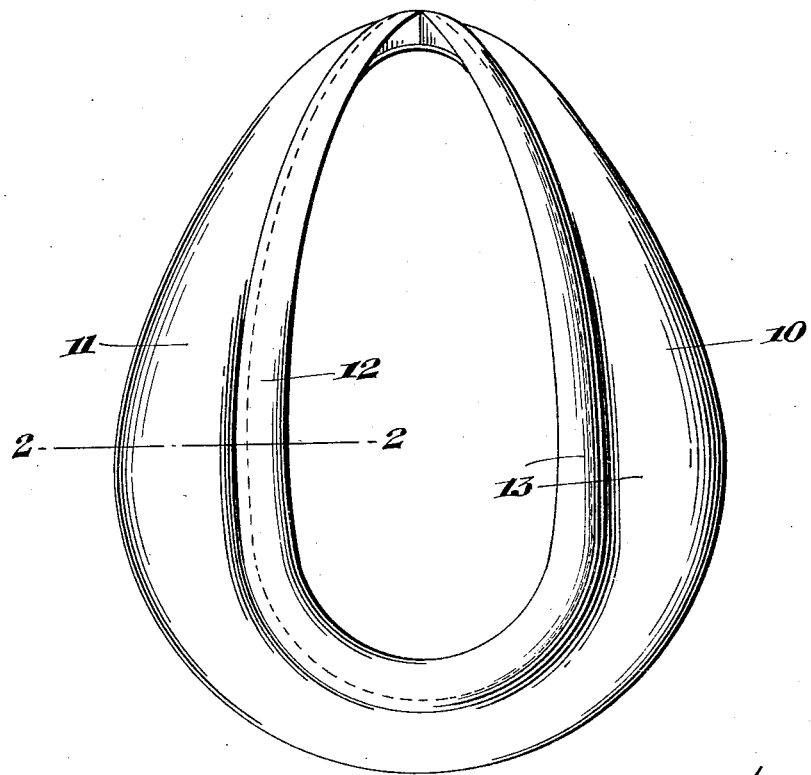
Inventor
James H. Wilson
BY
Attys.

Patented Feb. 7, 1928.

1,658,112

UNITED STATES PATENT OFFICE.

JAMES HORATIO WILSON, OF OTTAWA, ONTARIO, CANADA.

HORSE COLLAR.

Application filed March 7, 1927, Serial No. 173,492, and in Canada November 6, 1926.

This invention relates to improvements in horse collars and more particularly to the lining of horse collars.

The objects of the invention are to provide a horse collar with an even, flexible and resilient wearing surface that will not unevenly contact with the shoulders of an animal to cause them to become sore.

A further object is to provide an improved horse collar that can be manufactured and placed on the market at a low price.

With these and other objects hereinafter more fully referred to in view, my invention consists essentially in the combination with the outer lining and the stuffing of an ordinary horse collar of a pad substantially semi-circular in form of spongy or soft rubber fitted between the lining and the straw stuffing and provided on the bottom with a layer or strip of canvas or the like preferably vulcanized thereto.

Referring now to the drawings in which like characters of reference indicate corresponding parts in each figure:—

Figure 1 is a front elevation of my improved horse collar.

Figure 2 is a section on the line 2—2 of Figure 1.

In the drawings, 10 designates the horse collar as a whole, of any well known construction and comprising the body portion 11, a hame engaging bead 12, a lining of leather 13 stuffed with any suitable material such as straw 14. Between the lining 13 and the straw stuffing 14 is inserted a pad 15 substantiallly semi-circular in form to conform to the contour of the body 11 and having vulcanized thereto on the under side a strip of canvas 16.

From practical experience this pad has been found to cause the lining 13 to present an even contacting surface for the shoulders of an animal and at the same time be resilient and yieldable.

As many changes could be made in the above construction and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:

The combination with the stuffed body of a collar, of a substantially fillet-shaped rubber pad interposed between the stuffing and the lining of the collar and separated from the stuffing by a sheet of flexible material united to said pad substantially as described.

In witness whereof I have hereunto set my hand.

JAMES HORATIO WILSON.